US005089139A

United States Patent [19]

Asbeck

[11] Patent Number: 5,089,139

[45] Date of Patent: Feb. 18, 1992

[54] METHOD FOR REFINING VIRGIN OLIVE OIL BY MEMBRANE FILTRATION

[75] Inventor: Lutz S. Asbeck, Delmenhorst, Fed. Rep. of Germany

[73] Assignee: Van den Bergh Foods Co., Division of Conopco, Inc., Lisle, Ill.

[21] Appl. No.: 536,126

[22] Filed: Jun. 11, 1990

[30] Foreign Application Priority Data

Jun. 26, 1989 [GB] United Kingdom ................. 8914603

[51] Int. Cl.[5] ............................................ B01D 61/00

[52] U.S. Cl. .................................. 210/650; 210/652; 260/412; 260/412.3; 426/601; 426/330.6

[58] Field of Search ............... 210/649, 650, 651, 652, 210/654, 500.42; 426/330.6, 601; 260/412.3, 248, 412.2, 428.5, 412.4; 99/483

[56] References Cited

U.S. PATENT DOCUMENTS

| | | | |
|---|---|---|---|
| 4,062,882 | 12/1977 | Sen Gupta | 260/428.5 |
| 4,229,297 | 10/1980 | Nohmi et al. | 210/654 |
| 4,370,274 | 1/1983 | Finch et al. | 260/412.3 |
| 4,452,744 | 6/1984 | Finch et al. | 260/412.2 |
| 4,522,119 | 6/1985 | Finch et al. | 99/483 |
| 4,545,940 | 10/1985 | Mutoh et al. | 260/248 |
| 4,957,758 | 9/1990 | Drijftholt et al. | 426/330.6 |

OTHER PUBLICATIONS

IOCC/T.15/NE No. 1 in Olivae—11nd year-No. 8, p. 10, Section 2.1.1.1, Second (ii).
Abstract of French Patent Application 1598259.
Abstract of Spanish Patent Application 2007230.
Abstract of Spanish Patent Application 8707289.
Abstract of Spanish Patent Application 8605693.

*Primary Examiner*—Robert A. Dawson
*Assistant Examiner*—Ana M. Fortuna
*Attorney, Agent, or Firm*—Rimma Mitelman

[57] ABSTRACT

The invention relates to a method for refining virgin olive oil, in which the virgin olive oil is filtrated, characterized in that the virgin olive oil is micro-filtrated.

7 Claims, No Drawings

METHOD FOR REFINING VIRGIN OLIVE OIL BY MEMBRANE FILTRATION

BACKGROUND OF THE INVENTION

The present invention relates to a method for refining virgin olive oil.

The international commercial standards for olive oils (IOOC/T.15/NC nr. 1) of the International Olive Oil Council are given in OLIVAE-11nd Year-No. 8, page 9-14.

Virgin olive oil is defined according to these standards as the oil obtained from the fruit of the olive tree solely by mechanical or other physical means under conditions, particularly thermal conditions, that do not lead to alterations in the oil, and which has not undergone any treatment other than washing, decantation, centrifugation and filtration.

Virgin olive oil extra is defined as virgin olive oil of absolutely perfect flavour and odour having a maximum acidity in terms of oleic acid, of 1 g per 100 g.

Virgin olive oil fine is defined as virgin olive oil of absolutely perfect flavour and odour having a maximum acidity, in terms of oleic acid, of 1.5 g per 100 g.

Virgin olive oil semi fine is defined as virgin olive oil of good flavour and odour having a maximum acidity, in terms of oleic acid, of 3 g per 100 g, with a tolerance margin of 10% of the acidity indicated.

When virgin olive oil is stored for 24 hours at 20° C., this olive oil should remain limpid.

At present a common procedure used fo refining virgin olive oil comprises the steps of:

i) adding filter aid to the virgin olive oil, for instance 25 kg filter aid (Clarcel®, registered trademark) per 1000 kg virgin olive oil;

ii) filtering the slurry obtained over a precoated wire-mesh leaf filter;

iii) filtering the filtrate over used filter paper; and iv) filtering the paper filtered filtrate over fresh filter paper.

This conventionally used refining method requiring the use of filter aid and a multi-stage filtration treatment is cumbersome.

DESCRIPTION OF THE INVENTION

The invention has for its object to provide a refining method for virgin oil that complies with the condition given in the definition for virgin olive oil, but avoids the use of filter aid and a multi-stage filtration treatment.

Accordingly, the invention provides a method for refining virgin olive oil, and is characterized in that the virgin olive oil is microfiltrated using a microfilter. Surprisingly, it was found that subjecting the virgin olive oil to microfiltration, the microfiltrated filtrate is of a quality that is equal to that of conventionally refined virgin olive oil, although the cumbersome prior art treatments are avoided.

Generally, the virgin olive oil is filtrated over a microfilter having a pore size of less than 1 μm, preferably a nominal pore size in the range of 0.1–0.8 μm. When a microfilter having a nominal pore size of about 0.5–0.8 μm is used, relatively high filtration rates are obtained.

Commercially acceptable filtration rates are obtained if the microfiltration is used at a filtration pressure of about 5–0.3 bar. Microfiltration rates obtainable are about 10–100 kg/m$^2$/hour/bar. In order to avoid alterations in the virgin olive oil, the microfiltration is carried out at ambient temperature, for instance about 15°–35° C., preferably as from 20° C., such as 20°–35° C.

In the following example the microfiltration refining method according to the invention is illustrated and the quality of the refined microfiltrated virgin olive oil according to the invention is compared to the quality of virgin oil refined according to the conventional refining method.

EXAMPLE

Virgin olive oil extra is microfiltrated over a microfilter having a pore size of 0.65 μm (Millipore type DA) and a Millipore filter having a pore size of 0.22 μm (Millipore type GS). The filtration area is about 0.00096 m$^2$. During the microfiltration, the microfiltration pressure was controlled at 0.6 bar (pore size 0.65 μm) and 0.5 bar (pore size 0.22 μm). Microfiltration is carried out at 22°–23° C.

The average filtration rates over both types of microfilters were measured, a flux of 48 kg/m$^2$/hour/bar was obtained with the microfilter having a pore size of 0.65 μm, and a microfiltration rate of 20 kg/m$^2$/hour/bar using the microfilter having a pore size of 0.22 μm.

The oil losses due to oil retention in the filter cake on the microfilter was about 0.12%.

When appropriate the microfilter is backwashed with cold nitrogen gas.

The table given below summarizes the analytical data for the crude virgin olive oil extra used as starting material, for virgin olive oil A and B (microfiltrated using a microfilter having a pore size of 0.65 μm and 0.22 μm, respectively), and virgin olive oil extra obtained by the prior art refining method, in which filter aid and a multi-stage filtration treatment were used. It is noted that virgin olive oil does contaminate only very minor amounts of wax.

| | crude virgin olive oil | oil A | oil B | virgin olive oil refined acc. to the prior art |
|---|---|---|---|---|
| ffa (%) | 0.45 | 0.42 | 0.43 | 0.42 |
| Fe (ppm) | 1.2 | 0.6 | 0.5 | 0.7 |
| Al (ppm) | 0.6 | <0.02 | 0.05 | 0.03 |
| P (ppm) | <2.0 | <2.0 | <2.0 | not determined |

From the analytical data summarized in the table it is apparent that the virgin olive oils microfiltrated according to the invention (oil A and B) are of equal quality as the olive oil refined according to the prior art.

Samples of the microfiltrated oils A and B were subjected to the cold test in order to get an indication of the efficiency of the refining method according to the invention. The samples were filled in Duran-Schott GL45 bottles (100 ml) and stored in melting ice/water at 0° C. for 24 hours. A physical inspection after 24 hours showed bright samples.

I claim:

1. A method for refining virgin olive oil solely by mechanical or other physical means under conditions, particularly thermal conditions, that do not lead to alterations in the oil, in which method the oil has not undergone any treatment other than washing, decantation, centrifugation and filtration, the method consisting essentially of microfiltrating the virgin olive oil over a microfilter.

2. Method as claimed in claim 1, wherein the virgin olive oil is microfiltrated over the microfilter having a pore size of less than 1 μm.

3. Method as claimed in claim 2, wherein the microfilter has a pore size of about 0.1–0.8 μm.

4. Method as claimed in claim 3, wherein the microfilter has a pore size of about 0.5–0.8 μm.

5. Method as claimed in claim 1, wherein the microfiltration pressure is about 0.3–5 bar.

6. Method as claimed in claim 1, wherein the microfiltration rate is about 10–100 $kg/m^2/h/bar$.

7. Method as claimed in claim 1, wherein the microfiltration temperature is about 15°–35° C.

* * * * *